(12) United States Patent
Nádas et al.

(10) Patent No.: US 11,470,008 B2
(45) Date of Patent: Oct. 11, 2022

(54) MAXIMUM BUCKET SIZES FOR MULTIPLE TIMESCALES

(71) Applicant: Telefonaktiebolaget LM Ericsson (publ), Stockholm (SE)

(72) Inventors: Szilveszter Nádas, Budapest (HU); Illés Antal Horváth, Budapest (HU); András Mészáros, Budapest (HU); Miklos Telek, Budapest (HU); Balázs Varga, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/285,183

(22) PCT Filed: Sep. 19, 2019

(86) PCT No.: PCT/IB2019/057940
§ 371 (c)(1),
(2) Date: Apr. 14, 2021

(87) PCT Pub. No.: WO2020/079505
PCT Pub. Date: Apr. 23, 2020

(65) Prior Publication Data
US 2022/0006743 A1    Jan. 6, 2022

Related U.S. Application Data

(60) Provisional application No. 62/747,366, filed on Oct. 18, 2018.

(51) Int. Cl.
*H04L 47/215*    (2022.01)
*H04L 47/31*    (2022.01)
(Continued)

(52) U.S. Cl.
CPC .......... *H04L 47/215* (2013.01); *H04L 47/31* (2013.01); *H04L 47/32* (2013.01); *H04L 47/24* (2013.01)

(58) Field of Classification Search
CPC ... H04L 47/10; H04L 49/205; H04L 49/3009; H04L 45/00; H04L 45/60; H04L 45/745;
(Continued)

(56) References Cited

U.S. PATENT DOCUMENTS 7,688,727 B1 *  3/2010  Ferguson .......... H04L 63/0227
                                                          370/230.1
8,730,812 B2    5/2014  Figueira
(Continued)

FOREIGN PATENT DOCUMENTS

WO    2017169061 A1    10/2017
WO    2019096370 A1    5/2019
WO    2020074125 A1    4/2020

OTHER PUBLICATIONS

International Search Report and Written Opinion dated Nov. 21, 2019 for International Application No. PCT/IB2019/057940 filed on Sep. 19, 2019, consisting of 9-pages.
(Continued)

*Primary Examiner* — Djenane M Bayard
(74) *Attorney, Agent, or Firm* — Christopher & Weisberg, P.A.

(57) ABSTRACT

To support quality of service fairness in a communication network, a network node determines a maximum bucket size, for a token bucket controlling a transmission rate from the network node over a transport line between a radio access network and a core network, based on a drop precedence and a given timescale.

11 Claims, 9 Drawing Sheets

(51) Int. Cl.
*H04L 47/32* (2022.01)
*H04L 47/24* (2022.01)

(58) Field of Classification Search
CPC . H04L 45/74591; H04L 47/125; H04L 47/20; H04L 49/3036; H04L 49/3072; H04L 63/0227; H04L 69/22; H04L 47/11; H04L 63/1458; H04L 47/32; H04L 43/00; H04L 43/022; H04L 43/028; H04L 43/0829; H04L 43/0864; H04L 43/0888; H04L 43/16; H04L 43/50; H04L 47/215; H04L 47/24; H04L 47/2441; H04L 47/31; H04L 49/25; H04L 67/1001; H04L 47/21; H04L 47/326; H04L 47/50; H04L 47/527; H04L 47/6215; H04L 49/1546; H04L 49/3018; H04L 49/3063; H04L 49/50; H04L 49/552; H04L 49/602; H04L 49/90; H04L 49/9078
See application file for complete search history.

(56) References Cited

U.S. PATENT DOCUMENTS

| | | | |
|---|---|---|---|
| 9,350,674 B2 | 5/2016 | Figueira | |
| 2003/0081546 A1* | 5/2003 | Agrawal | H04L 47/50 370/412 |
| 2003/0086413 A1* | 5/2003 | Tartarelli | H04L 47/32 370/468 |
| 2018/0324827 A1* | 11/2018 | Abraham | H04L 47/215 |
| 2019/0090229 A1 | 3/2019 | Iwai et al. | |

OTHER PUBLICATIONS

MEF Technical Specification MEF 10.2; Ethernet Services Attributes Phase 2; The Metro Ethernet Forum, Oct. 27, 2009, consisting of 65-Pages.

Indian Office Action dated Feb. 4, 2022 for Patent Application No. 202117012755, consisting of 6-pages.

* cited by examiner

300

DETERMINING A MAXIMUM BUCKET SIZE, FOR A TOKEN BUCKET CONTROLLING A TRANSMISSION RATE FROM THE NETWORK NODE OVER A TRANSPORT LINE BETWEEN A RADIO ACCESS NETWORK AND A CORE NETWORK, BASED ON A DROP PRECEDENCE AND A GIVEN TIMESCALE
310

RESPONSIVE TO RECEIVING A DATA PACKET OF A FLOW AND THE TOKEN BUCKET CONTAINING AT LEAST A NUMBER OF TOKENS CORRESPONDING TO A SIZE OF THE DATA PACKET, REDUCING THE NUMBER OF TOKENS IN THE TOKEN BUCKET BY THE SIZE OF THE DATA PACKET, FORWARDING THE DATA PACKET, AND ADDING TOKENS TO THE TOKEN BUCKET NOT IN EXCESS OF THE MAXIMUM BUCKET SIZE AT A RATE BASED ON THE DROP PRECEDENCE AND THE GIVEN TIMESCALE
320

*FIG. 11*

MAXIMUM BUCKET SIZES FOR MULTIPLE TIMESCALES

CROSS-REFERENCE TO RELATED APPLICATIONS

This application is a Submission Under 35 U.S.C. § 371 for U.S. National Stage Patent Application of International Application No.: PCT/IB2019/057940, filed Sep. 19, 2019 entitled "MAXIMUM BUCKET SIZES FOR MULTIPLE TIMESCALES," which claims priority to U.S. Provisional Application No. 62/747,366, filed Oct. 18, 2018, the entireties of both of which are incorporated herein by reference.

TECHNICAL FIELD

The present application generally relates to network quality of service (QoS), and more particularly relate fairly controlling transmission rate in a node for a plurality of timescales.

BACKGROUND

Network Quality of Service (QoS) is a fundamental area of networking research that has been researched for a long time. Despite this, there continues to be effort to improve how QoS is provided within a network. In particular, fairness (e.g., per flow, per subscriber) is an important aspect of QoS. Where needed it is usually provided by per flow weighted fair queuing (WFQ). However, WFQ does not scale as the number of flows increases. Core-stateless schedulers have provided a solution to this that provides fairness on a single timescale, typically at the timescale of round-trip time (RTT). Notwithstanding, even slight improvements to QoS approaches often produce significantly beneficial results, particularly when considered in aggregate. As such, improvements to QoS technologies are highly sought after.

SUMMARY

It is an object of one or more embodiments herein to determine one or more bucket sizes for respective token buckets of a node in a network, such that the node may use the token buckets to fairly control transmission rate for a plurality of timescales.

More particularly, embodiments of the present disclosure include a method of supporting quality of service fairness in a communication network. The method is performed by a network node. The method comprises determining a maximum bucket size, for a token bucket controlling a transmission rate from the network node over a transport line between a radio access network and a core network, based on a drop precedence and a given timescale.

In some embodiments, the given timescale is one of a plurality of timescales over which the network node supports quality of service fairness, each of the timescales corresponding to a respective time interval. The drop precedence is one of a plurality of predefined drop precedences supported by the network node. The token bucket is one of a plurality of token buckets, each of the token buckets corresponding to a unique combination of one of the predefined drop precedences and one of the timescales. Each of the unique combinations corresponds to a respective token rate. According to some such embodiments, determining the maximum bucket size based on the drop precedence and the given timescale comprises scaling a rate factor, determined based on the drop precedence and the given timescale, by a scaling factor determined based on the given timescale. For example, in some such embodiments, the given timescale is a smallest of the timescales and the method further comprises using the time interval corresponding to the given timescale as the scaling factor, and using the token rate corresponding to the combination of the drop precedence and the given timescale as the rate factor. In other such embodiments, the given timescale is a second-smallest of the timescales and the method further comprises using the time interval corresponding to the given timescale as the scaling factor, and using, as the rate factor, a first token rate minus a second token rate. The first token rate corresponds to the combination of the drop precedence and a smallest of the timescales. The second token rate corresponding to the combination of the drop precedence and the given timescale. In other such embodiments, the given timescale is larger than a second-smallest of the timescales, and determining the maximum bucket size based on the drop precedence and the timescale further comprises determining:

$$\Sigma_{k=1}^{ts}(TS_k - TS_{k-1})(R_{dp,k-1} - R_{dp,ts});$$

ts is an ordinality of the given timescale among the timescales from smallest to largest. $TS_k$ is the time interval corresponding to the kth-smallest timescale. $R_{dp,k}$ is the token rate corresponding to the combination of the drop precedence and the kth-smallest timescale.

In some embodiments, the method further comprises, responsive to receiving a data packet of a flow and the token bucket containing at least a number of tokens corresponding to a size of the data packet, reducing the number of tokens in the token bucket by the size of the data packet, forwarding the data packet, and adding tokens to the token bucket not in excess of the maximum bucket size at a rate based on the drop precedence and the given timescale.

In some embodiments, the transport line is a leased line under a service level agreement, and determining the maximum bucket size for the token bucket controlling the transmission rate from the network node over the transport line comprises controlling the transmission rate such that the transmission rate complies with the service level agreement.

Other embodiments include a network node configured to determine a maximum bucket size, for a token bucket controlling a transmission rate from the network node over a transport line between a radio access network and a core network, based on a drop precedence and a given timescale.

In some embodiments, the network node is further configured to perform any of the methods discussed herein.

In some embodiments, the network node comprises processing circuitry and memory, the memory containing instructions executable by the processing circuitry whereby the network node is configured.

In some embodiments, the network node comprises one or more units or modules configured to perform any of the methods discussed herein. In some such embodiments, a determining module is configured to perform the determining.

Other embodiments include a computer program comprising instructions which, when executed by processing circuitry of a network node, causes the network node to carry out any of the methods described herein.

Other embodiments include a carrier containing the computer program of embodiment 15, wherein the carrier is one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a network node 20, generally, as opposed to discussion of particular instances of network nodes 20a, 20b).

FIG. 11 is a flow diagram illustrating an example method in accordance with one or more embodiments of the present disclosure.

DETAILED DESCRIPTION

Figure 1:
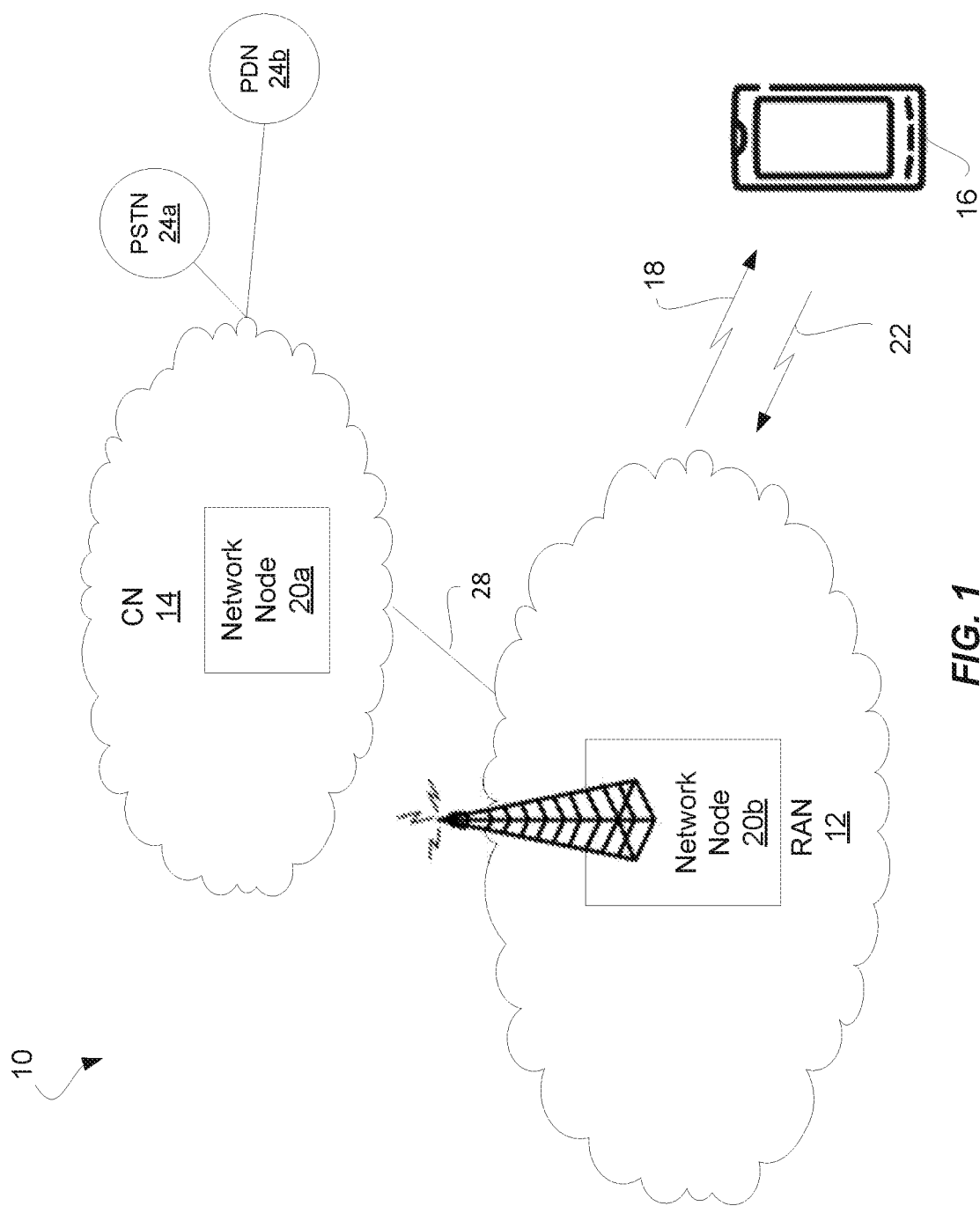
FIG. 1 is a schematic diagram of an example networking system, according to one or more embodiments of the present disclosure.

FIG. 1 illustrates an example networking system 10 according to one or more embodiments. As shown in FIG. 1, the networking system 10 (e.g., a Long Term Evolution (LTE) or Fifth Generation (5G) network) includes a radio access network (RAN) 12 and a core network (CN) 14. The RAN 12 wirelessly connects one or more wireless devices 16 to the CN 14 via a transport line 28. The CN 14 in turn connects the one or more wireless devices 16 to one or more external networks 24a, 24b. As shown, these one or more external networks 24a, 24b include a public switched telephone network (PSTN) 24a and a packet data network (PDN) 24b, such as the Internet.

According to this system 10, a network node 20b in the RAN 12 (e.g., an access node) may wirelessly send signals to a wireless device 16 on a downlink 18, and wirelessly receive signals from the wireless device 16 on an uplink 22. A network node 20a in the CN 14 (e.g., a core network node) may support QoS for flows through the CN 14 originating from and/or destined for the wireless device 16. Either network node 20a, 20b may mark packets per flow at the edge of the CN 14. In some embodiments, the marking enables simple, flow-unaware scheduling in the CN 14 based on the marking. In other embodiments, the marking additionally or alternatively enables more elaborate scheduling, as discussed below.

According to particular embodiments of the present disclosure, a network node 20 (e.g., an access node, CN node, or simply "node") supports QoS fairness over multiple timescales. These multiple timescales may, for example, address the different impacts that traffic having different time-based characteristics have on network resources. In particular, short bursty flows may impact the network differently than flows having longer, less-bursty flows. Thus, one or more embodiments discussed herein provide a resource sharing scheme that takes into account the traffic history of customers and makes it possible to establish a service level agreement (SLA) that supports QoS on multiple time scales more efficiently, effectively, simply, and/or with greater granularity than previous approaches. Particular embodiments simplify core-stateless resource sharing using relatively few Drop Precedences (DP). Traditionally, a DP is used to describe an extent to which is a packet may be dropped rather than forwarded. Typically, a packets assigned a higher DP is deemed more "droppable" by the network than packets assigned a relatively lower DP.

More specifically, embodiments of the present disclosure enable a continuously downloading subscriber to have little to no effect on a subscriber intermittently downloading small/medium files. Such embodiments, e.g., address a modern trend of traffic becoming increasingly bursty. This trend also applies to traffic aggregates, e.g. the aggregated traffic of 5G base stations.

One reason 5G base stations in particular are tending to demonstrate more bursty characteristics is that, with beamforming, the achievable peak rates increase dramatically, while the increase in the average rate is less dramatic. When deploying mobile networks, operators often lease a transport line 28 of the Mobile Backhaul (MBH) from the CN 14 to the Base Stations. For example, the SLAs standardized by Metro Ethernet Forum are generally successful and used for Ethernet Leased Lines. An SLA is a contract between the Subscriber and Service Provider specifying the agreed to service level commitments and related business agreements.

The transport services and related bandwidth profiles (BWPs) defined by the Metro Ethernet Forum (MEF) are often used for this purpose. A bandwidth profile typically enforces limits on bandwidth utilization according to a Service Level Specification (SLS) agreed upon by a Subscriber and a Service Provider as part of the SLA. However, using currently known service definitions, it is not possible to achieve per flow (e.g., over a leased line) fairness. Such service definitions also only take into account a small timescale, e.g., the instantaneous behavior of traffic sources.

Some embodiments of the present disclosure provide fairness on time-scales longer than RTT by introducing caps, e.g., a monthly cap on traffic volume. Embodiments of the present disclosure may additionally or alternatively provide fairness on time-scales longer than RTT by limiting the congestion volume instead of the traffic volume. Embodiments of the present disclosure may additionally or alternatively provide fairness on time-scales longer than RTT using one or more of the methods discussed below, e.g., by extending the current MEF bandwidth profile to provide fairness on a plurality of timescales and/or applying core stateless scheduling on marked packets.

Figure 2:
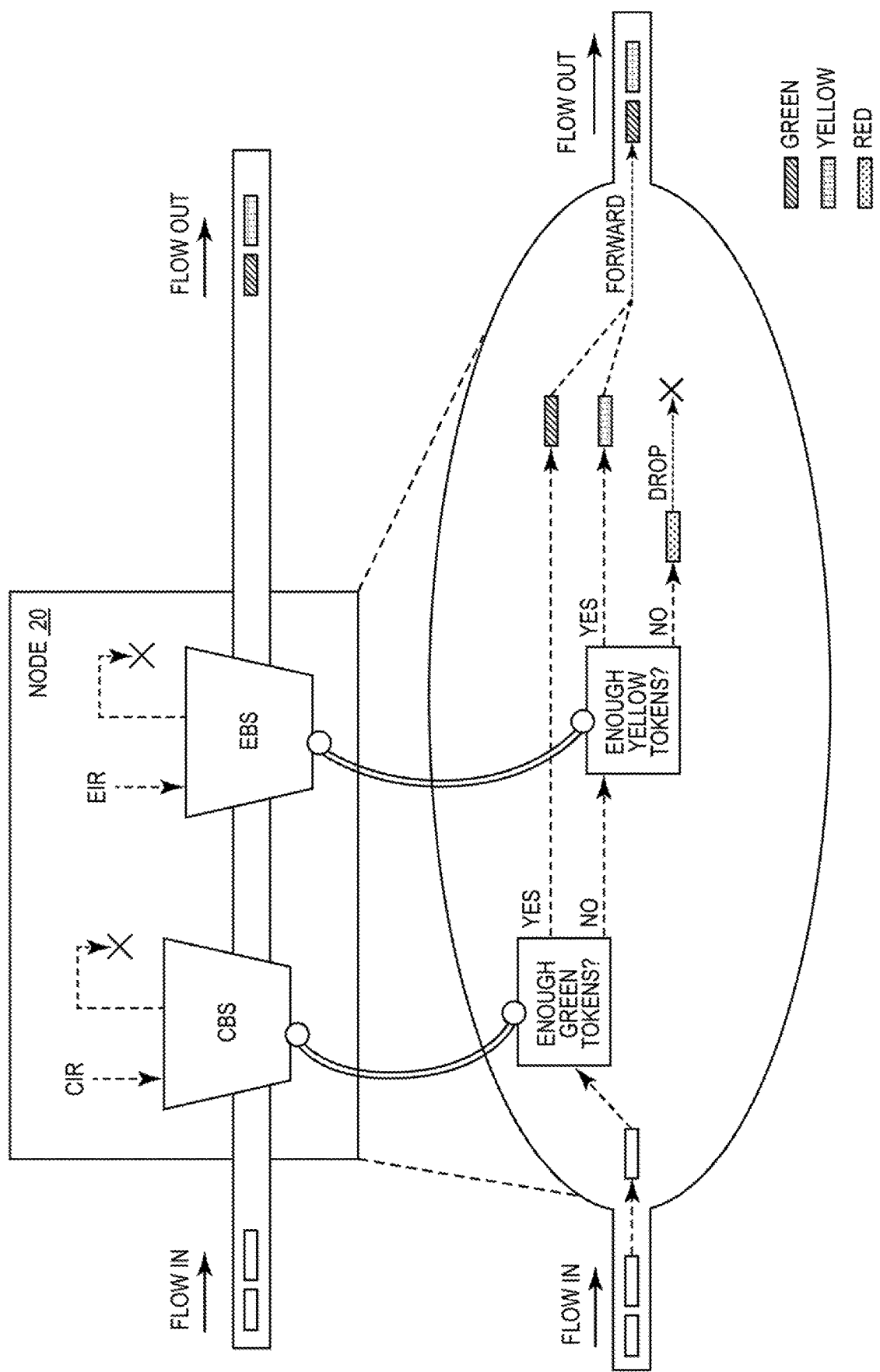
FIG. 2 is a schematic diagram of a bandwidth profile, according to one or more embodiments of the present disclosure.

A simple bandwidth profile algorithm implemented by a node in accordance with one or more embodiments of the present disclosure is illustrated in FIG. 2. The profile comprises rate parameters. In particular, the profile comprises a guaranteed Committed Information Rate (CIR) and a best-effort Excess Information Rate (EIR). A CIR is a data rate in which, as long as packets are sent with a speed and burstiness within the CIR, such packets will be transmitted with a high probability (~100%). An EIR is a data rate in which packets fitting into this rate might be transmitted, but there is no guarantee. Each of these rate parameters is associated with a token bucket (Committed Burst Size (CBS) and Excess Burst Size (EBS), respectively), the sizes of which are typically set to CBS≈CIR×RTT, and EBS≈EIR×RTT.

In the field of packet switched networks, a token bucket algorithm is analogous to a fixed capacity bucket into which tokens are added at a fixed rate. The tokens represent a unit size (e.g., a byte, a single packet, etc.). When a packet is to be checked for conformance to defined limits, the bucket is inspected to see if it contains sufficient tokens at that time. If so, the appropriate number of tokens, e.g., equivalent to the length of the packet in bytes, are removed from the bucket and the packet is forwarded (e.g., transmitted). If there are insufficient tokens in the bucket, the packet may be dropped, queued, or marked as non-conformant and transmitted, whereas the contents of the bucket are not changed. Packets that are marked as non-conformant may thereafter be more readily dropped by other devices in the network as needed.

As shown in FIG. 2, a node receives a flow of packets. The node marks a packet based on the amount of tokens in one or more of the token buckets. According to this example, the node determines whether to forward the packet based on whether there are enough tokens in the CBS token bucket. If so, the node marks the packet as conforming to CIR (e.g., marked "green"), removes one or more tokens from the CBS token bucket, and forwards the packet. If not, the node determines if there are enough tokens in the EBS token bucket. If so, the node marks the packet as conforming to EIR (e.g., marked "yellow"), removes one or more tokens from the EBS token bucket, and forwards the packet. If not, the node drops the packet (e.g., by marking the packet accordingly, in this example, "red"). Thus, according to this example, packets are marked as either conforming to CIR (e.g., marked "green"), conforming to EIR (e.g., marked "yellow"), or dropped (e.g., marked "red") based on the amount of tokens in the associated token buckets. According to this example, a bucket is considered to have enough tokens if the bucket contains at least as many tokens as the packet size, and if a packet is marked a given color, that many tokens are removed from the corresponding bucket.

The simple example bandwidth profile algorithm illustrated in FIG. 2 may be extended by increasing the number of drop precedences (DPs) (i.e., "colors"). This may include, for example, introducing multiple token buckets per drop precedence, representing different time-scales (TSs). An example of a Multi-Timescale Bandwidth Profile (MTS-BWP) in accordance with one or more embodiments of the present disclosure is illustrated in FIG. 3.

Figure 3:
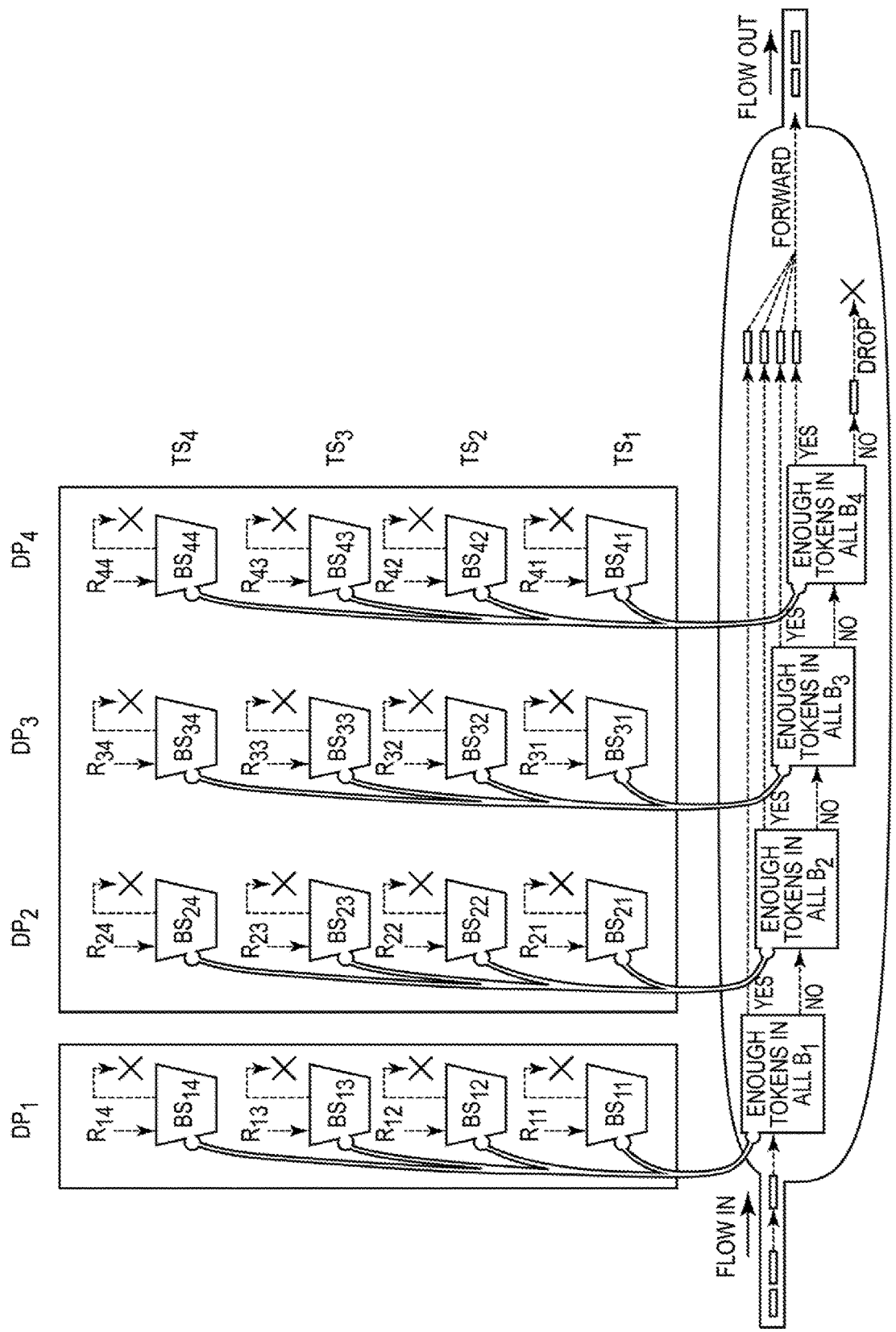
FIG. 3 is a schematic diagram of a bandwidth profile supporting multiple timescales and multiple drop precedences, according to one or more embodiments of the present disclosure.

According to the example MTS-BWP illustrated in FIG. 3, the number of DPs ($N_{dp}$) is $N_{DP}=4$ and the number of TSs ($N_{TS}$) is $N_{TS}=4$. The first DP ($DP_1$) is similar to "green" marked packets in the example of FIG. 2, in that $DP_1$ is intended to guarantee transmission of packets. The other non-dropped packets are similar to the "yellow" marked packets in the example of FIG. 2, except that it is intended that the node provide a more refined service for such packets than simple best effort. However, in contrast to the BWP of FIG. 2 (which marks packets according to their compliance or non-compliance with the specific CIR and EIR), the MTS-BWP performs marking based on the status of the buffers.

The token rate of the bucket associated with a given DP=dp and TS=ts is $R_{dp,ts}$ and the bucket size of a given DP and TS is $BS_{dp,ts}$, which is set to $BS_{dp;ts} \approx R_{dp;ts} \times TS_{ts}$. An example time scale vector with $N_{TS}=4$ is $TS=\{TS_1, \ldots, TS_4\}=\{0.1, 1, 10, 100 \text{ sec}\}$, where it is assumed that $TS_1 \approx RTT$. That is, $R=\{R_{dp,ts}\}$ and $BS=\{BS_{dp,ts}\}$ are matrices of size $N_{DP} \times N_{TS}$. A packet may be marked a given DP value dp if all buckets $BS_{dp,ts}$, $\forall ts \in \{1, \ldots, N_{TS}\}$ (which may be referred to in shorthand as $\forall ts$) contain enough tokens. Upon successful marking, all buckets of that dp are decreased by the size of the marked packet.

Because some embodiments offer lower bandwidth on higher timescales, in such embodiments the rows of R are monotonically decreasing ($R_{dp,ts+1} \geq R_{dp,ts}$, $\forall dp,ts$).

Particular embodiments of the present disclosure employ an Active Queue Management (AQM) algorithm in which a FIFO buffer drops the largest DP from the head of the buffer. More precisely when the buffer is full, the node determines the largest DP which has a packet present in the buffer and drops the packet closest to the head of the buffer having this DP. This algorithm can be implemented efficiently by applying such AQM for 4 DPs. This behavior can also be approximated on existing hardware by representing drop precedences with Differentiated Services Code Point (DSCP) values, configuring these DSCPs to the same queue, and configuring the "red" profiles to drop the different DPs at increasing queue lengths (i.e., to drop the largest DP at the smallest queue length).

Performance of various methodologies proposed may, for example, be experimentally analyzed in a fast and simple fluid simulator, particularly when the intended focus is not on packet level behavior and the interaction of congestion control and scheduling. That is, a fast and simple simulator may be employed, e.g., when the focus of interest is in how the newly introduced bandwidth profile provides fairness on several timescales, when the system is ideal (e.g., when the used congestion control (CC) can utilize its share instantaneously and with no packet loss). As will be discussed below, the general principles vetted from this simulation may be applied to the network node 20.

According to embodiments of the present disclosure, a common bottleneck shared among several nodes with identical bandwidth profile configuration may be modeled. A node may have several active flows. When no bandwidth profile is applied, nodes share the bottleneck proportionally to the number flows within the nodes. The applied bandwidth profile constrains this allocation such that all traffic with DP above congestion DP is transmitted and those with DP below the congestion DP are discarded. Bandwidth allocation within the congestion DP is still according to the number of flows per node.

The token level in each bucket of a node is maintained and "fluid" flows out from each bucket of a given row according to the transmission rate of the network node 20 on the relevant DP.

The bottleneck buffer, in this example, is not modeled and the related Burst Size (on the RTT timescale) is set to 0 ($BS_{dp,1}=0$) in the fluid simulator. The transmission rate of a node on a given DP is restricted by the Rate associated with empty buckets on that DP. As the Token Level (TL) $TL_{dp,1}$ is always 0, $R_{dp,1}$ is the highest possible transmission rate on that dp.

The simulator may be described by a plurality of parameters. For example, C may be used to describe the total service capacity, N may be used to describe the number of nodes, R and BS may be used as described as above (and for purposes of this example, may be assumed to be the same for all nodes), and a flow limit may describe a maximum number of concurrent active flows at each node, such that further flows at that node are discarded.

A compound Poisson point process may be used as an input, where the arrival time and size of each arriving flow is listed for each node. Input may be generated from a list of possible file sizes with probabilities, and arrival rate for each node. Each node may have a nominal speed ($S_n$), which is $S_n=C/N$, $\forall N$ in particular cases. The nominal load of each node may then be calculated as nominal load=average file size×arrival rate/$S_n$. A node may be considered low load if its nominal load is less than 1 and high load if its nominal load is higher than 1. The entire system may be considered underloaded if the average of the nominal loads for all nodes is less than 1 and overloaded if it is higher than 1.

Accordingly, a discrete event simulator may run a simulation using a given input for a given set of system parameters. Such a simulator may identify a plurality of events, such as flow arrival, flow finishing, and/or the emptying of a token bucket. The simulator may additionally or alternatively track a list of active flows, a remaining size of each active flow, a list of flows yet to arrive, and/or token bucket levels (e.g., for each node, for each time scale, and/or for each DP level).

In some embodiments, these variables are sufficient to determine the time and type of the next event and the current bandwidth allocation which applies until the next event. The simulator then proceeds to the next event, updates all information and iterates this loop.

Once finished, the simulator of this example provides as output a list of all event times, a list of the bandwidth allocation for each node and each DP level between events, and/or a flow count for each node at each event time. From these, a number of key performance indicators (KPIs) may be calculated, such as average node bandwidth (during active periods) and/or average flow bandwidth.

The bounds determined by the bucket levels may be collected into a DP×N matrix denoted by BD whose elements are $BD_{dp,n} = {}_{ts}^{min}\{R_{dp,ts}: TL(n, dp, ts)=0\}$, where ts denotes the running index of timescales and TL (n, dp, ts) denotes the token level in the token bucket at node n on DP level dp and timescale ts.

DPs signify priority in the sense that whenever congestion occurs (the offered traffic exceeds the capacity of a link) the transmission rate on higher DPs (i.e., traffic marked with a higher DP value) is reduced first. Therefore in case of congestion there is a congestion DP, which is the highest DP in which traffic is sent. On DPs lower than the congestion DP, the congestion has no effect; the bandwidth on these DP levels is determined only by the token buckets of the given DP.

On DPs below the congestion DP, each node gets bandwidth based on its token buckets, on the given DP, and on the congestion DP. The remaining bandwidth of the link is split so that the total bandwidth (considering all DPs) of each flow is close to each other to reflect the flow fairness of Transmission Control Protocol (TCP).

In view of the above, embodiments include an iterative algorithm that calculates the bandwidth allocation. Said algorithm may be expressed in terms of $f_n$ (the number of flows in node n), $th_n$ (the throughput of node n, initialized to 0 for all n), and $e_n$ (which indicates that a node n is eligible for increase, which is initialized to True for all n).

First, the congestion DP $dp_c$ may be calculated as:

$$\min\{dp_c : \Sigma_{dp=1}^{dp_c-1} BD_{dp,n} \geq C\}.$$

Then, $th_n$ may be initialized for all n as:

$$th_n = \Sigma_{dp=1}^{dp_c-1} BD_{dp,n}.$$

Then, the following three steps may be iterated through until $\Sigma_{n=1}^{N} th_n = C$:

Step 1: Set nodes with $th_n = \Sigma_{dp=1}^{dp_c}$ to non-eligible ($e_n$=false).

Step 2: Mark all eligible nodes for which the ratio $th_n/f_n$ is minimal among all eligible nodes.

Step 3: Increase $th_n$ for all marked nodes by $f_n \cdot \delta$, where $\delta > 0$ is calculated as the maximal possible increase such that the following remain valid:

Rule A: $th_n = \Sigma_{dp=1}^{dp_c} BD_{dp,n}$ for all n.

Rule B: The ratio $th_n/f_n$ from among all marked nodes does not increase beyond the second smallest ratio $th_n/f_n$ from among all eligible nodes.

Rule C: $\Sigma_{n=1}^{N} th_n \leq C$.

Note that eligible nodes are kept track of throughout the iteration, but marked nodes are recalculated for each iteration. Also, the bandwidth calculation algorithm actually used in simulations may actually be slightly improved, e.g., by taking slightly larger steps which may reduce the number of iterations.

Figure 4:
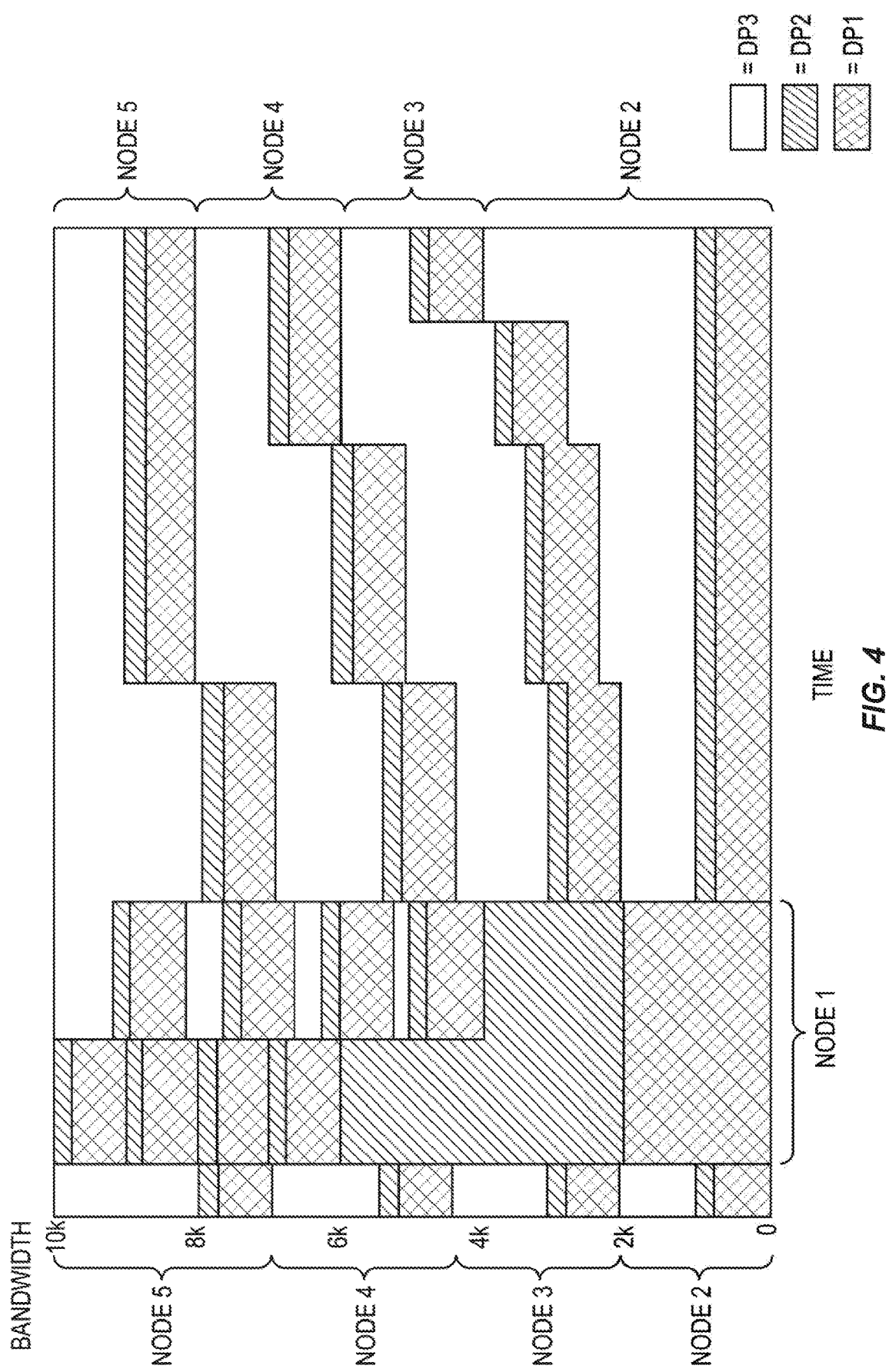
FIG. 4 is a graph illustrating bandwidth allocation over time, according to one or more embodiments of the present disclosure.

FIG. 4 illustrates the change of the bandwidth allocation as a time series, as actually observed by testing embodiments of the present disclosure (i.e., setup A discussed below, with a total load of 0:95). Node/DP level combinations are shown as bands of the graph. The different shades correspond to respective drop precedence levels. The DPs of each node are stacked together in ascending order (e.g., DP1, DP2, DP3, from lowest to highest on the graph), and the nodes are stacked on each other in ascending order. In this example, node 1 is the low load node.

Node 1 is inactive in the beginning, and the congestion level is dp3. Then node 1 becomes active and the congestion level switches to dp2. As shown in FIG. 4, node 1 starts using 2 Gbps+4 Gbps of the available capacity on dp1 and dp2 respectively, while nodes 2 through 5 switch use of 0.25+0.75 Gbps respectively. Nodes 2 through 5 also start accumulating tokens on dp3.

As time progresses, node 1 switches to timescale 2 and its bandwidth share drops accordingly to 2 Gbps+2 Gbps. The congestion level switches back to 3, but level 3 is used only by nodes 2 through 5, proportional to their aggressiveness (total number of flows).

Once node 1 finishes, the available bandwidth is reallocated to nodes 2 through 5 on dp3. As the nodes use up their available tokens on dp3, they switch back to larger timescales one by one. First, node 5 (purple) switches timescales on dp3 and its share drops accordingly, followed by node 4 (yellow), and then node 3 (blue).

In the meantime, new flow arrivals and finished services at nodes 2 through 5 may occur and cause minor changes in the bandwidth allocation (e.g. a flow at node 2 (green) finishes during the period when node 1 is on timescale 2).

Proper dimensioning of R and BS may be performed in order to obtain certain desired properties of the bandwidth profile. For purposes of explanation, and without limitation, a system with N nodes having identical MTS-BWP configuration over a bottleneck link with capacity C may be considered. Various example embodiments may have one or more required properties. For example, it may be required for predefined download speeds $BW_1$, $BW_2$, ... (decreasing) for files of given sizes $fs_1$, $fs_2$, ... (increasing) arriving at a previously inactive node to be provided ($BW_1$ may also be the peak rate provided to a node after an inactive period). Additionally or alternatively, it may be required that the nominal speed $S_N = C/N$ to each node in long-term average be provided. Additionally or alternatively, it may be required that the long-term average speed $BW_1 > S_N$ for lightly loaded nodes be provided. Additionally or alternatively, it may be required that the minimum guaranteed speed (depending on the timescale, decreasing) G1, G2, ... $G_{TS}$ for any active node be provided. Additionally or alternatively, it may be required that a guaranteed work conserving property be provided (i.e., when there is traffic, the full link capacity is used). Particular embodiments (e.g., as will be discussed below), require all five of these requirements.

In the following analysis we focus on the $N_{DP}=4$ and $N_{TS}=4$ case, which allows for two file sizes with predefined downloads speeds using the first two timescales, while the other two timescales are used to differentiate according to long term behavior (low load and high load nodes). The guidelines that follow generalize for more timescales in a straightforward manner (e.g., to allow a higher number of file sizes with predefined downloads speeds). The question of the number of drop precedence levels is often more delicate. For example, four DP levels may allow enough versatility to achieve the desired properties listed above, with possibly declining returns when using more than four DP levels. A high number of DP levels may also be technologically infeasible or inconvenient, for example.

In view of the above, a simple dimensioning method for a 4×4 matrix R based on the five requirements for the dimensioning of R and BS discussed above. According to this example, all rows of R should be decreasing. Moreover, with respect to R, the first drop precedence level may be used for the guaranteed speeds $G_1$, $G_2$, ... (and so on). $DP_2$ is the congestion level while at least one low load is active (so $DP_2$ is also where the predefined download speeds apply). $DP_3$ or $DP_4$ is the congestion level for high load nodes while low load nodes are inactive. The last DP level is used to guarantee the work conserving property.

In accordance with these guidelines, the following structure may define R, according to particular embodiments:

$$R = \begin{bmatrix} G_1 & G_2 & G_3 & G_4 \\ BW_1 - G_1 & BW_2 - G_2 & BW_3 - G_3 & \frac{C - BW_1}{N-1} - G_4 \\ * & * & * & S_N - \frac{C - BW_1}{N-1} \\ C & C & C & C \end{bmatrix}$$

The first row ($DP_1$) is straightforward and simply implements the guaranteed speeds. Note that $G_1 \leq S_N$ needs to hold to avoid congestion on $DP_1$.

$R_{3,4}$ is defined so that $R_{1,4}+R_{2,4}+R_{3,4}=S_N$ holds. This important property will be referred to herein as the return rule. More precisely, the return rule holds for a matrix R, in general, if there is a DP level dp such that $\Sigma_{i=1}^{dp} R_{i,N_{TS}} = S_N$.

The return rule may be important to particular embodiments for two reasons. First, as long as all other nodes are either on timescale $N_{TS}$ or inactive, any node may get at least the nominal rate $S_N$ allocated. Second, over a time period when all other nodes are either on timescale $N_{TS}$ or inactive, any node with nominal load less than 1 may be able to return from the last timescale.

Additionally or alternatively, $R_{2,4}$ may be defined so that $(N-1)(R_{1,4}+R_{2,4})+BW_1=C$. This may ensure that in the case when one node becomes active while all other nodes are on the last timescale, the freshly active node gets bandwidth $BW_1$ allocated. Accordingly, $R_{2,1}$ may be calculated so that $R_{1,1}+R_{2,1}=BW_1$ (and similarly for $R_{2,2}$ and $R_{2,3}$).

The last row guarantees the work conserving property because as long as at least one node is active, that node has access to the entire capacity C. (Of course, if there are several active nodes, congestion control is also applied.)

Finally, the system is relatively insensitive to the exact values of the elements marked with an asterisk since typically other elements will limit the bandwidth. For example, high load nodes are on timescale 4, while low load nodes use $DP_1$ and $DP_2$. Thus, the elements marked with an asterisk can generally be selected arbitrarily as long as row 3 of R is decreasing.

According to this particular example, the file sizes for the predefined download speeds only affect the bucket size matrix BS. For typical choices of the parameters, the rows of R are decreasing, but for embodiments in which they are not, R would need to be appropriately adjusted. Of course, other embodiments may include additional or fewer timescales, which may be introduced in a straightforward manner to accommodate additional or fewer predefined file sizes and/or download rates. According to embodiments in which fewer DP levels are used, fewer rows in R may be similarly used accordingly (e.g., one fewer row per DP level). Omitting the first row would result in no guaranteed speeds. Omitting the second row removes the predefined download speeds, resulting in a system very similar to MEF, with nearly no memory. Omitting the third row violates the return rule. Omitting the last row of R results in a non-work conserving system, where it may occur that their previous history limits nodes to the point where less than the available capacity is used.

One particular suitable example of R may be as follows, based on N=5, C=10 Gbps, guaranteed speeds of $G_1=G_2=G_3=2$ and $G_4=0.75$, file download speeds $BW_1=6$, $BW_2=4$ and low load rate $BW_3=3$:

$$R = \begin{bmatrix} 2 & 2 & 2 & 0.75 \\ 4 & 2 & 1 & 0.25 \\ 10 & 10 & 1 & 1 \\ 10 & 10 & 10 & 10 \end{bmatrix}$$

Generally speaking, and as will be exemplified below, the sizes of the buckets may be calculated from the rates in R (e.g., such as the particular example R shown above). A list of timescales TS may also be calculated, e.g., in accordance with $TS=[0, fs_1/BW_1, fs_2/BW_2, t_{load}]$, wherein $fs_1$ and $fs_2$ are predefined file sizes. According to particular embodiments, a node generally switches to timescale i after being active for time $TS_i$.

$TS_1=0$ represents the RTT timescale in the fluid model. Because buffering is not modeled, instantaneous adaptation is assumed. The second and third elements of T simply correspond to download times of the predefined file sizes, and $t_{load}$ indicates how long a node must be on or above nominal speed $S_N$ to be counted as heavily loaded. The bandwidth profile is relatively insensitive to the exact choice of $t_{load}$. In general, approximately an order larger than the previous timescale may be a good choice according to various embodiments.

In view of the above, to dimension the bucket sizes, the bucket sizes may be set according to the following example equation:

$$BS_{dp,ts} = \begin{cases} 0 & \text{if } R_{dp,ts} = C \text{ or } ts = 1 \\ TS_2(R_{dp,1} - R_{dp,2}) & \text{for } ts = 2 \\ \sum_{k=2}^{ts}(TS_k - TS_{k-1})(R_{dp,k-1} - R_{dp,ts}) & \text{for } ts > 2 \end{cases} \quad (1)$$

which may result in a previously inactive node switching to time scale i after time $TS_i$ (at any of the DP levels where it is limited only by its own history and not by other nodes, taking into account the fact that it uses different bandwidth on different timescales).

Buckets with token bucket size 0 may act as rate limiters; also, for buckets with rate C, it may be pointless to set a positive bucket size because that bucket will, in some embodiments, never limit the node. Also, the equation above may be particularly applicable to embodiments in which the rows of R are strictly decreasing. If $R_{dp,k}=R_{dp,k-1}$ for some k, then in fact only one of these two buckets will limit the bandwidth. In this case, set $BS_{dp,k}=BS_{dp,k-1}$ and omit the term corresponding to $R_{dp,k}$ from further sums in equation (1).

Given the principles discussed above, the bucket size of a token bucket corresponding to a given timeframe may, e.g., be determined based on the average bucket speed the leased line 28 is capable of maintaining over the given timeframe as defined by the token bucket rate of the token bucket. Such an approach may be suitable for both smaller timescales (corresponding to higher bitrates of the token buckets) and longer timescales. Such an approach builds on a probabilistic SLA approach in which an R matrix contains the rates of the token buckets.

Additionally or alternatively, the maximum sizes of the buckets (or MBS—Maximum Burst Sizes (hereinafter expressed as BS)) of a node may be calculated from the rates in R, based on a list of timescales TS (e.g., as discussed above). In particular, the bucket sizes (BSs) of one or more token buckets of a node may be determined based on the formula:

$$BS_{dp,ts} = \begin{cases} TS_1 R_{dp,1} & \text{for } ts = 1 \\ TS_2(R_{dp,1} - R_{dp,2}) & \text{for } ts = 2 \\ \sum_{k=2}^{ts}(TS_k - TS_{k-1})(R_{dp,k-1} - R_{dp,ts}) & \text{for } ts > 2 \end{cases} \quad (2)$$

The bucket sizes determined in accordance with one or more of the embodiments discussed herein result in a previously inactive node switching to time scale i after time $TS_i$ (at any of the DP levels where it is limited only by its own history and not by other nodes), taking into account the fact that it uses different bandwidth ($R_{dp,1} \ldots R_{dp,ts}$) on different timescales.

Thus, the sizes of the buckets may be determined based on the associated timescale (in which TS denotes the vector of timescales). For example, the bucket size may be $TS_1 * R_{dp,1}$ for the smallest timescale. Such a bucket may be responsible for short term fluctuations only, as $TS_1$ is small compared to other TSs.

Buckets associated with timescales ts>1 of level dp may be dimensioned such that, from a fresh state (e.g., when all buckets are full of tokens), it takes $TS_{ts}$ time from the start of transmission for the bucket to become empty if there is no congestion on $DP_{dp}$ during this period the average transmission speed is $R_{dp,ts}$. When transmission starts the level of the second bucket on $DP_{dp}$ decreases with rate $R_{dp,1}-R_{dp,2}$ (e.g., as tokens pour into the bucket with rate $R_{dp,2}$ and packets are transmitted with tokens flowing out according to $R_{dp,1}$ because of the rate limiter behavior of bucket $TB_{dp,1}$) for time $TS_2$ at which point it becomes empty, thus $BS_{dp,2}=(R_{dp,1}-R_{dp,2}) TS_2$.

Upon starting transmission, the level of the third bucket decreases with $R_{dp,1}-R_{dp,3}$ rate for $TS_2$ time. At this point the second bucket becomes empty and the transmission rate on the DP drops to $R_{dp,2}$, thus for the following $TS_3-TS_2$ the level of the bucket decreases with $(R_{dp,2}-R_{dp,3})$ rate at which point it becomes empty. Consequently, according to particular embodiments, $BS_{dp,3}=(R_{dp,1}-R_{dp,2}) TS_2+(R_{dp,2}-R_{dp,3})(TS_3-TS_2)$.

One statistic that is important with respect to particular embodiments is average node bandwidth (inactive periods excluded). Another important statistics with respect to particular embodiments is the average flow bandwidth, averaged separately for small and large flows (e.g., in order to examine prioritization of small flows vs large flows).

The suggested 4×4 matrix R discussed above (referred to hereinafter as the 44 policy) may be compared to MEF policy as a baseline for various setups. The total number of nodes is N=5 and the capacity is C=10000 (Mbps) in each setup. The flow distribution is 50%-50% 100 MB (small) and 1 GB (large) flows, with the node limit set to 20 for each node. For the nominal loads of the nodes, the setups A-D defined below may be used.

Setup A includes one low load node and four high load nodes, with low load fixed at 0.5, and with high load varying so that the total system load goes through the range 0.6, 0.7, 0.8, 0.9, 0.95, 1, 1.1, 1.2, 1.5, 2.

Setup B includes two low load nodes and three high load nodes, with low load fixed at 0.5, and with high load varying so that the total system load goes through the range 0.6, 0.7, 0.8, 0.9, 0.95, 1, 1.1, 1.2, 1.5, 2.

Setup C includes one low load node and four high load nodes, with total system load fixed at 1.1, and low load varying through the range 0.5; 0.6; 0.7; 0.8; 0.9; 0.95, and high load decreasing accordingly.

Setup D includes two low load nodes and three high load nodes, with total system load fixed at 1.1, and low load going through the range 0.5; 0.6; 0.7; 0.8; 0.9; 0.95, and high load decreasing accordingly.

Figure 5:
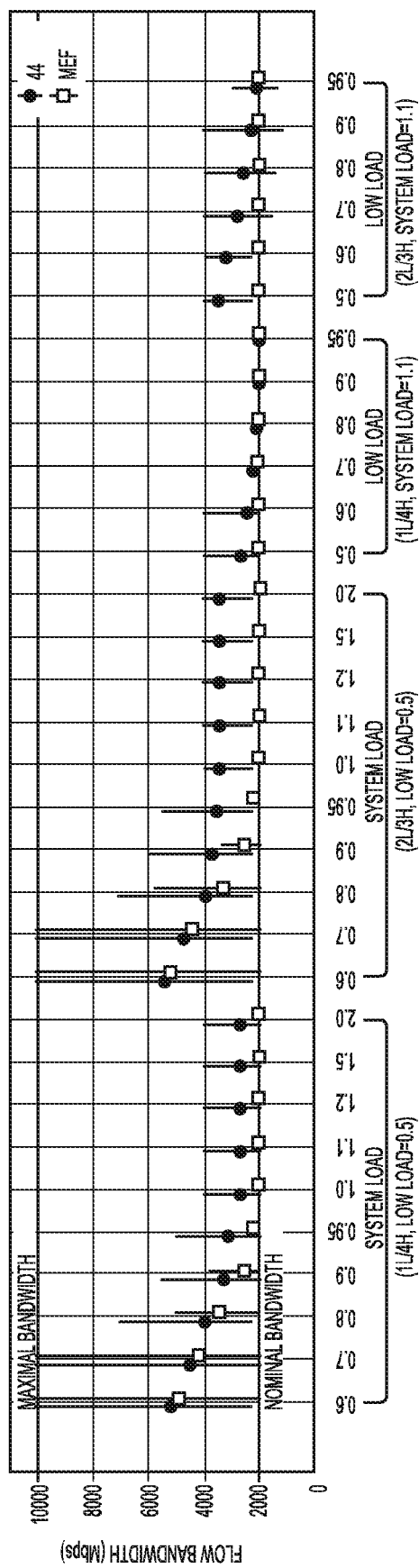
FIG. 5 is a graph depicting node bandwidth for low load nodes observed by applying bandwidth profiles in accordance with one or more embodiments of the present disclosure.

The statistics illustrated in FIGS. 5-10 were all derived from a 1-hour test run (with extra initial warm-up excluded from the statistics). FIG. 5 in particular displays node bandwidth statistics for low load nodes for MEF vs. the 44 policy. The error bars display the worst 10%-best 10% interval, with a dot marking the average. The 44 policy consistently outperforms MEF in allocating more bandwidth to low load nodes. The average bandwidth for the 44 policy is higher in every scenario, and the best possible case (best 10% values) is also significantly higher in most scenarios. The 44 policy provides the most improvement in scenarios where the system is overloaded. Interestingly, in a 2L/3H (i.e., a two low load, three high load) setup, each low load node performs better than the single low load node in a 1L/4H setup. This is due to the fact that for a low load node, the remaining 1L+3H nodes provide less competition overall than 4H.

It should further be noted that when the system is underloaded, MEF also performs well. For the 1L/4H setup, the low load node averages not quite reach the 3 Gbps ($R_{1,3}$+$R_{2,3}$) desired. This may be due to the fact that even for load 0.5, the low load node sends some portion of the time on the largest timescale, reducing its bandwidth. Finally, as the load of the low load node approaches 1, the difference between MEF and the 44 policy gradually disappears.

Figure 6:
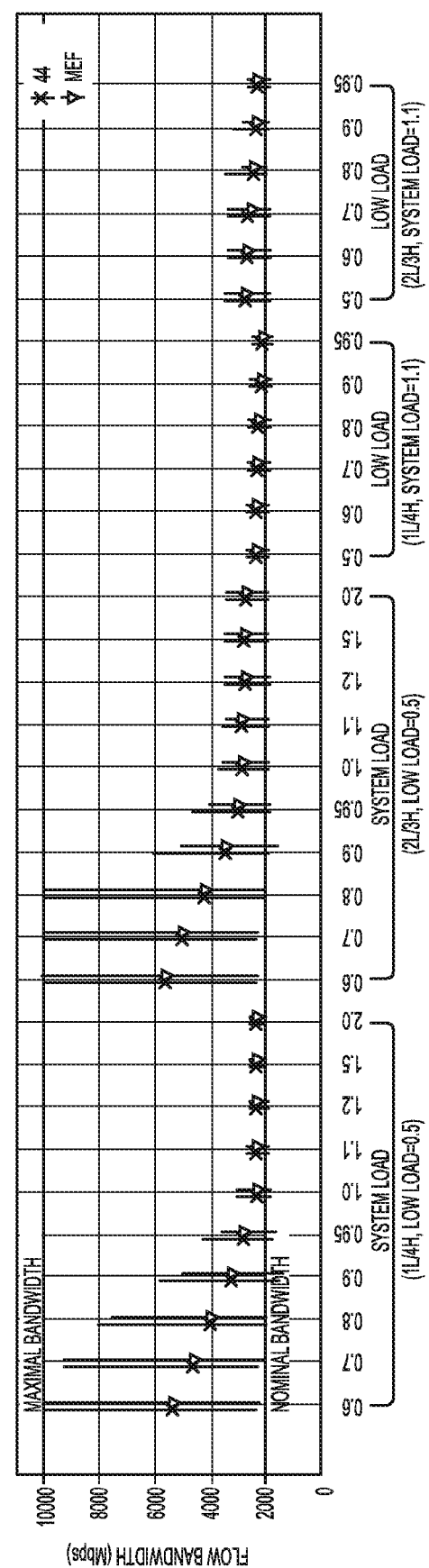
FIG. 6 is a graph depicting node bandwidth for high load nodes observed by applying bandwidth profiles in accordance with one or more embodiments of the present disclosure.

FIG. 6 displays the similar statistics for high load nodes. An significant observation here is that the considerable gain for low load nodes in FIG. 5 comes at virtually no cost to high load nodes. The difference between the average bandwidth for high load nodes for MEF as compared to the 44 policy is negligible.

The real gain with the 44 policy is that traffic from low load nodes is served faster, which improves the performance of low load nodes, but at the same time does not diminish the average bandwidth of the high load nodes, as capacity allocated to low load nodes during active periods is reallocated to high load nodes during inactive periods of the low load nodes.

Figure 7:
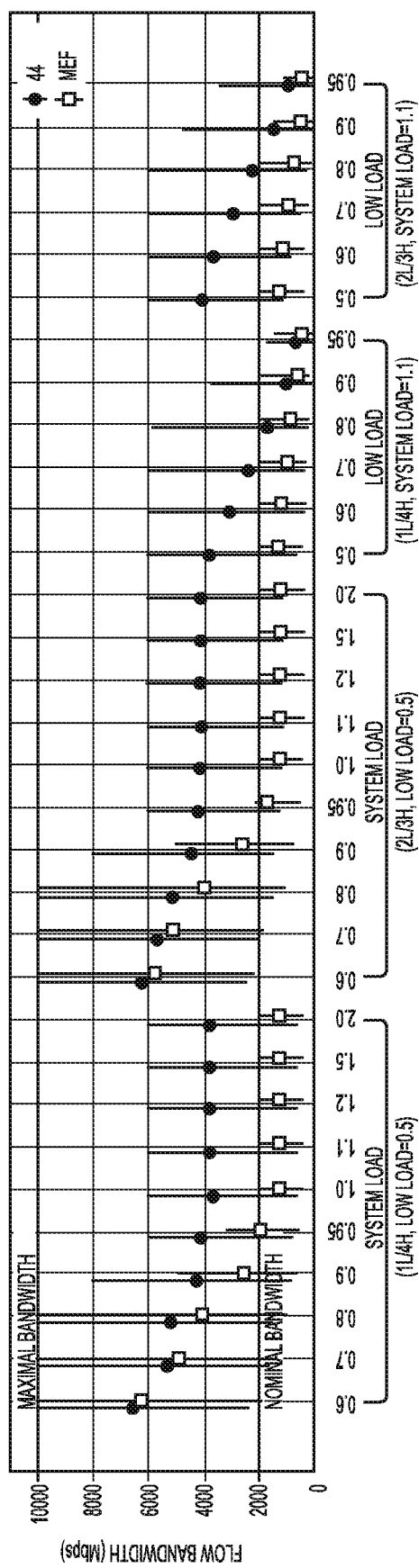
FIG. 7 is a graph depicting flow bandwidth for small flows at low load nodes observed by applying bandwidth profiles in accordance with one or more embodiments of the present disclosure.

Next the prioritization of small flows as compared to large flows provided by the 44 relative to MEF may be evaluated with respect to FIG. 7. FIG. 7 displays flow bandwidth statistics. That is, average bandwidth per flow for small flows (100 MB) at low load nodes for MEF as compared to the 44 policy. As shown in FIG. 7, the 44 policy outperforms MEF in allocating more bandwidth to small flows at low load nodes for every setup, but particularly for overloaded systems, where the difference is huge, both for average and also for best 10% values. Also, as the low load is approaching 1, the difference between MEF and the 44 policy diminishes (just as for the node bandwidth as shown in FIG. 5), as it should be. Also, for the 44 policy, the best 10% values for small flows reach 6 Gbps ($BW_1$) for all scenarios where the low load is below 0.9.

Figure 8:
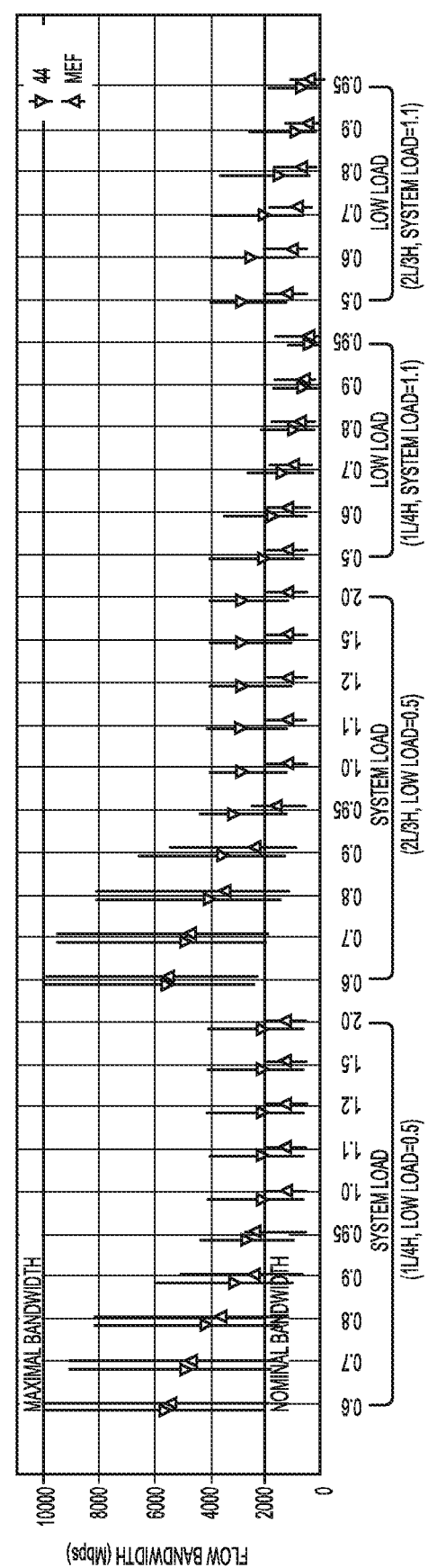
FIG. 8 is a graph depicting flow bandwidth for large flows at low load nodes observed by applying bandwidth profiles in accordance with one or more embodiments of the present disclosure.
Figure 9:
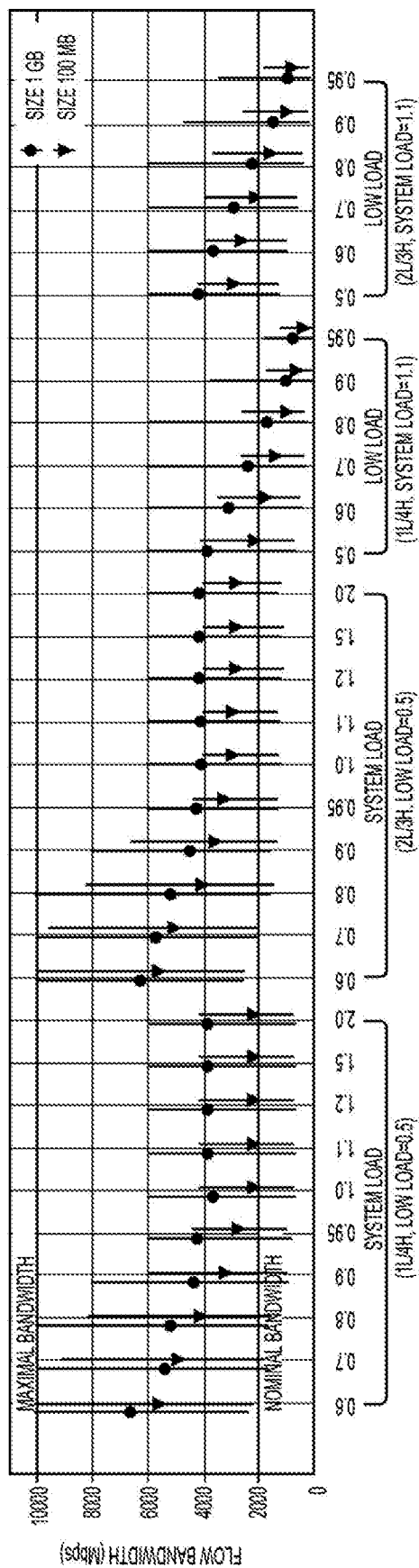
FIG. 9 is a graph depicting flow bandwidth for flows of different sizes at low load nodes observed by applying a bandwidth profile in accordance with one or more embodiments of the present disclosure.

FIG. 8 displays similar statistics for large flows (1 GB) at low load nodes. Again, the 44 policy outperforms MEF significantly. The prioritization of the 44 policy is revealed in FIG. 9, which displays flow bandwidth statistics for small vs. large flows at low load nodes for the 44 policy. The 44 successfully provides a prioritization between small flows and large flows at low load nodes.

Figure 10:
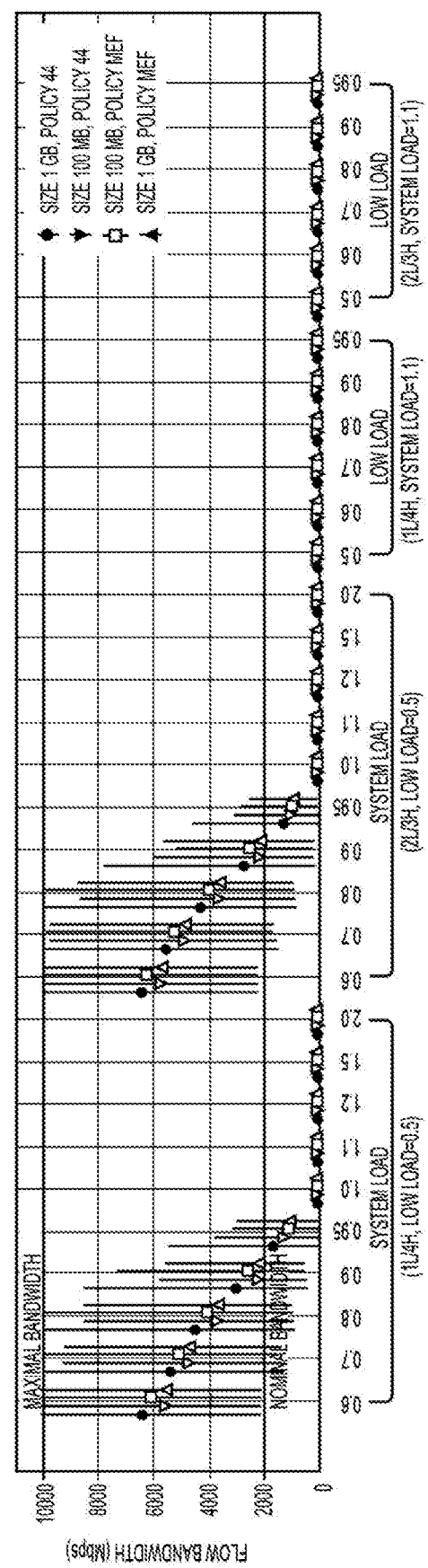
FIG. 10 is a graph depicting flow bandwidth for flows of different sizes at high load nodes observed by applying bandwidth profiles in accordance with one or more embodiments of the present disclosure.

FIG. 10 displays flow bandwidth at high load nodes for both small and large flows for both MEF and the 44 policy. There is a sharp distinction between underloaded systems and overloaded systems. For underloaded systems, even at high load nodes, typically only very few flows are active at the same time, resulting in relatively large flow bandwidths for individual flows. However, as the system load approaches 1, the per flow bandwidth drops gradually, and for overloaded systems, high load nodes are generally in an overloaded state, operating near the flow limit. For the current setups, the flow limit per node is set to 20, and accordingly, the flow bandwidth per node is typically close to the nominal bandwidth divided by 20. In general, the average flow bandwidth for high load nodes is very sensitive to the flow limit parameter, so for these nodes, the node bandwidth may be more informative.

In view of the above, the proposed Multi Timescale Bandwidth Profile can extend fairness from a single timescale to several timescales. Dimensioning methods have also been proposed that deploy Service Level Agreements based on MTS-BWP, which can provide target throughputs for files of different sizes on low load leased lines. Low load nodes may also, in general, be differentiated from high load ones. The simulation results discussed herein reveal high throughput gains on low load nodes with marginal or no throughput decrease on high load links. Particular embodiments associate the token bucket rate of a multi-time scale bandwidth profiler with behavior in which, for the period defined by the timescale the leased line shall be able to maintain the average bucket speed as defined by the token bucket rate of the given token bucket. Such may include the higher bitrates of the token buckets on the smaller timescales.

As such, as shown in FIG. 11, embodiments of the present disclosure include a method 300 implemented by a network node 20. The method 300 comprises determining a maximum bucket size, for a token bucket controlling a transmission rate from the network node 20 over a transport line 28 between a radio access network 12 and a core network 14, based on a drop precedence and a given timescale (block 310). In some embodiments, the method further comprises, responsive to receiving a data packet of a flow and the token bucket containing at least a number of tokens corresponding to a size of the data packet, reducing the number of tokens in the token bucket by the size of the data packet, forwarding the data packet, and adding tokens to the token bucket not in excess of the maximum bucket size at a rate based on the drop precedence and the given timescale (block 320). Some embodiments additionally or alternative comprise one or more other features discussed herein.

Note that a network node 20 herein is any type of node in the RAN (e.g., a base station) or CN (e.g., MME). Where the network node is a radio network node in the RAN, the node 20 may be capable of communicating with another node over radio signals. A wireless device 16 is any type device capable of communicating with a radio network node over radio signals. A wireless device 16 may therefore refer to a machine-to-machine (M2M) device, a machine-type communications (MTC) device, a narrowband Internet of Things (NB-IoT) device, etc. The wireless device may also be a user equipment (UE), however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that the network node 20 as described above may perform the processing herein by implementing any functional means or units. In one embodiment, for example, the network node 20 comprises respective circuits configured to perform the steps shown in FIG. 11. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the network node 20 contains instructions executable by the processing circuitry network node 20 is configured to carry out the processing herein.

Figure 12:
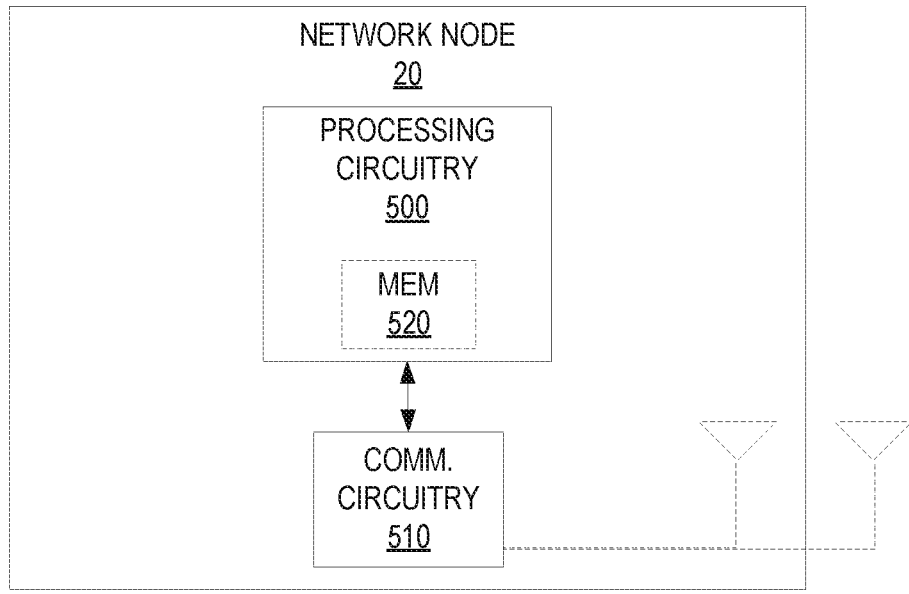
FIG. 12 is a schematic diagram of an example network node in accordance with one or more embodiments of the present disclosure.

FIG. 12 illustrates additional details of a network node 20 in accordance with one or more embodiments. As shown, the network node 20 includes one or more processing circuits 500 and communication circuitry 510. The communication circuitry 510 is configured to communication with one or more other nodes, e.g., the wireless device 16 and/or a radio network node. Where the network node 20 is a radio network node, the communication circuitry 510 is configured to transmit and/or receive via one or more antennas. The one or more processing circuits 500 are configured to perform processing described above, e.g., in FIGS. 2 and/or 4, such as by executing instructions stored in memory 520. The one or more processing circuits 500 in this regard may implement certain functional means or units.

Figure 13:
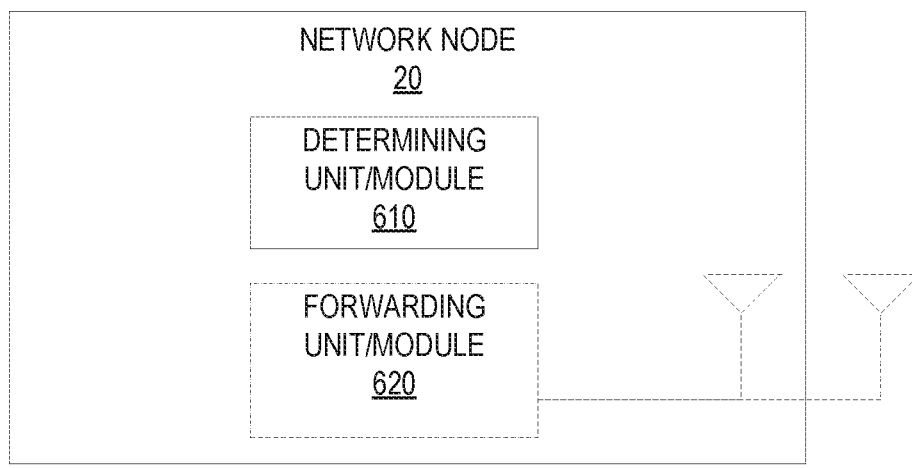
FIG. 13 is a schematic diagram of an example network node in accordance with one or more embodiments of the present disclosure.

FIG. 13 in this regard illustrates a network node 20 in accordance with one or more other embodiments. As shown, the network node 20 may include a determining unit or module 610 configured to determine a maximum bucket size, for a token bucket controlling a transmission rate from the network node 20 over a transport line 28 between a radio access network 12 and a core network 14, based on a drop precedence and a given timescale. In some embodiments, the network node 20 further comprises a forwarding unit or module 620 configured to, responsive to receiving a data packet of a flow and the token bucket containing at least a number of tokens corresponding to a size of the data packet, reduce the number of tokens in the token bucket by the size of the data packet, forward the data packet, and add tokens to the token bucket not in excess of the maximum bucket size at a rate based on the drop precedence and the given timescale. These modules or units may be implemented by the processing circuitry 500 of FIG. 12. In some embodiments, the network node 20 additionally or alternatively comprises one or more other units or modules configured to perform one or more other features described herein.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Other embodiments will now be described with respect to certain contexts. These embodiments are combinable with and expound upon embodiments above.

Those skilled in the art will appreciate that the various methods and processes described herein may be implemented using various hardware configurations that generally, but not necessarily, include the use of one or more microprocessors, microcontrollers, digital signal processors, or the like, coupled to memory storing software instructions or data for carrying out the techniques described herein. In particular, those skilled in the art will appreciate that the circuits of various embodiments may be configured in ways that vary in certain details from the broad descriptions given above. For instance, one or more of the processing functionalities discussed above may be implemented using dedicated hardware, rather than a microprocessor configured with program instructions. Such variations, and the engineering tradeoffs associated with each, will be readily appreciated by the skilled practitioner. Since the design and cost tradeoffs for the various hardware approaches, which may depend on system-level requirements that are outside the scope of the present disclosure, are well known to those of ordinary skill in the art, further details of specific hardware implementations are not provided herein.

Embodiments of the present disclosure may additionally or alternatively include one or more aspects of the embodiments enumerated below, and/or any compatible combination of features described herein. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended embodiments are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A method, implemented by a network node, of supporting quality of service fairness in a communication network, the method comprising:

determining a maximum bucket size, for a token bucket controlling a transmission rate from the network node over a transport line between a radio access network and a core network, based on a drop precedence and a given timescale, determining the maximum bucket size based on the drop precedence and the given timescale comprises scaling a rate factor, determined based on the drop precedence and the given timescale, by a scaling factor determined based on the given timescale;

the given timescale being one of a plurality of timescales over which the network node supports quality of service fairness, each of the timescales corresponding to a respective time interval, the given timescale being a second smallest of the plurality timescales;

the drop precedence being one of a plurality of predefined drop precedences supported by the network node;

the token bucket being one of a plurality of token buckets, each of the token buckets corresponding to a unique combination of one of the predefined drop precedences and one of the timescales;

each of the unique combinations corresponds to a respective token rate;

using the time interval corresponding to the given timescale as the scaling factor; and using, as the rate factor, a first token rate minus a second token rate, the first token rate corresponding to the combination of the drop precedence and a smallest of the timescales, and the second token rate corresponding to the combination of the drop precedence and the given timescale.

2. The method of claim 1, wherein the given timescale is a smallest of the timescales and the method further comprises:

using the time interval corresponding to the given timescale as the scaling factor; and using the token rate corresponding to the combination of the drop precedence and the given timescale as the rate factor.

3. The method of claim 1, wherein:

the given timescale is larger than the second-smallest of the timescales; and determining the maximum bucket size based on the drop precedence and the timescale further comprises determining:

$\Sigma_{k=1}^{ts}(TS_k-TS_{k-1})(R_{dp,k-1}-R_{dp,ts})$;

ts is an ordinality of the given timescale among the timescales from smallest to largest;

$TS_k$ is the time interval corresponding to the kth-smallest timescale; and $R_{dp,k}$ is the token rate corresponding to the combination of the drop precedence and the kth-smallest timescale.

4. The method of claim 1, further comprising responsive to receiving a data packet of a flow and the token bucket containing at least a number of tokens corresponding to a size of the data packet:

reducing the number of tokens in the token bucket by the size of the data packet;

forwarding the data packet; and adding tokens to the token bucket not in excess of the maximum bucket size at a rate based on the drop precedence and the given timescale.

5. The method of claim 1, wherein the transport line is a leased line under a service level agreement, and determining the maximum bucket size for the token bucket controlling the transmission rate from the network node over the transport line comprises controlling the transmission rate such that the transmission rate complies with the service level agreement.

6. A network node comprising:

processing circuitry and memory, the memory containing instructions executable by the processing circuitry whereby the network node is configured to:

determine a maximum bucket size, for a token bucket controlling a transmission rate from the network node over a transport line between a radio access network and a core network, based on a drop precedence and a given timescale, determining the maximum bucket size based on the drop precedence and the given timescale comprises scaling a rate factor, determined based on the drop precedence and the given timescale, by a scaling factor determined based on the given timescale, the given timescale is a second smallest of the timescales:

use the time interval corresponding to the given timescale as the scaling factor; and use, as the rate factor, a first token rate minus a second token rate, the first token rate corresponds to the combination of the drop precedence and a smallest of the timescales, and the second token rate correspond to the combination of the drop precedence and the given timescale.

7. A non-transitory computer-readable storage medium storing a computer program comprising instructions which, when executed by processing circuitry of a network node, causes the network node to carry out a method of supporting quality of service fairness in a communication network, the method comprising:

determining a maximum bucket size, for a token bucket controlling a transmission rate from the network node over a transport line between a radio access network and a core network, based on a drop precedence and a given timescale, determining the maximum bucket size based on the drop precedence and the given timescale comprises scaling a rate factor, determined based on the drop precedence and the given timescale, by a scaling factor determined based on the given timescale;

the given timescale being one of a plurality of timescales over which the network node supports quality of service fairness, each of the timescales corresponding to a respective time interval, the given timescale being a second smallest of the plurality timescales;

the drop precedence being one of a plurality of predefined drop precedences supported by the network node;

the token bucket being one of a plurality of token buckets, each of the token buckets corresponding to a unique combination of one of the predefined drop precedences and one of the timescales;

each of the unique combinations corresponds to a respective token rate;

using the time interval corresponding to the given timescale as the scaling factor; and using, as the rate factor, a first token rate minus a second token rate, the first token rate corresponding to the combination of the drop precedence and a smallest of the timescales, and the second token rate corresponding to the combination of the drop precedence and the given timescale.

8. The network node of claim 6, wherein the given timescale is a smallest of the timescales and the network node is further configured to:

use the time interval corresponding to the given timescale as the scaling factor; and use the token rate corresponding to the combination of the drop precedence and the given timescale as the rate factor.

9. The network node of claim 6, wherein:

the given timescale is larger than the second smallest of the timescales;

and the network node further being configured to determine the maximum bucket size based on the drop precedence and the timescale further comprises the network node being configured to determine:

$\Sigma_{k=1}^{ts}(TS_k-TS_{k-1})(R_{dp,k-1}-R_{dp,ts})$;

ts is an ordinality of the given timescale among the timescales from smallest to largest;

$TS_k$ is the time interval corresponding to the kth-smallest timescale; and $Rd_{dp,k}$ is the token rate corresponding to the combination of the drop precedence and the kth-smallest timescale.

10. The network node of claim 6, whereby the network node is, responsive to receiving a data packet of a flow and the token bucket containing at least a number of tokens corresponding to a size of the data packet, further configured to:

reduce the number of tokens in the token bucket by the size of the data packet;

forward the data packet; and add tokens to the token bucket not in excess of the maximum bucket size at a rate based on the drop precedence and the given timescale.

11. The network node of claim 6, wherein the transport line is a leased line under a service level agreement, and the network node being configured to determine the maximum bucket size for the token bucket controlling the transmission rate from the network node over the transport line comprises the network node being further configured to control the transmission rate such that the transmission rate complies with the service level agreement.

* * * * *